United States Patent [19]

Bailey

[11] 3,918,844
[45] Nov. 11, 1975

[54] MEANS AND METHODS OF COMPRESSING ATMOSPHERIC AIR AND PRODUCING POWER AND VEHICULAR PROPELLANTS THEREFROM

[76] Inventor: Wayne Bailey, Box 89, Johnsonville, N.Y.

[22] Filed: Mar. 6, 1974

[21] Appl. No.: 448,765

[52] U.S. Cl. .............................................. 417/229
[51] Int. Cl.² ........................................ F04B 9/00
[58] Field of Search ........ 417/229, 231, 328; 92/92, 92/96

[56] References Cited
UNITED STATES PATENTS

| 282,070 | 7/1883 | Garsed | 92/96 |
| 792,839 | 6/1905 | Naethery et al. | 417/229 |
| 862,867 | 8/1907 | Eggleston | 417/395 |
| 949,297 | 2/1910 | Frentzen | 92/92 |
| 1,374,116 | 4/1921 | Schorr | 417/360 |
| 1,771,200 | 7/1930 | Akers | 417/229 |
| 2,060,890 | 11/1936 | Olafson | 417/229 |
| 2,333,614 | 11/1943 | Boyd | 417/229 |

*Primary Examiner*—William L. Freeh
*Assistant Examiner*—G. P. LaPointe

[57] ABSTRACT

Means and methods of creating compressed air by the movement of road vehicles within the road and over fibrous reinforced rubber air compressing apparatus, as well as the transfer and the use of said so manufactured compressed air in air actuated power plants and air liquefaction and vehicular propulsion equipment.

1 Claim, 13 Drawing Figures

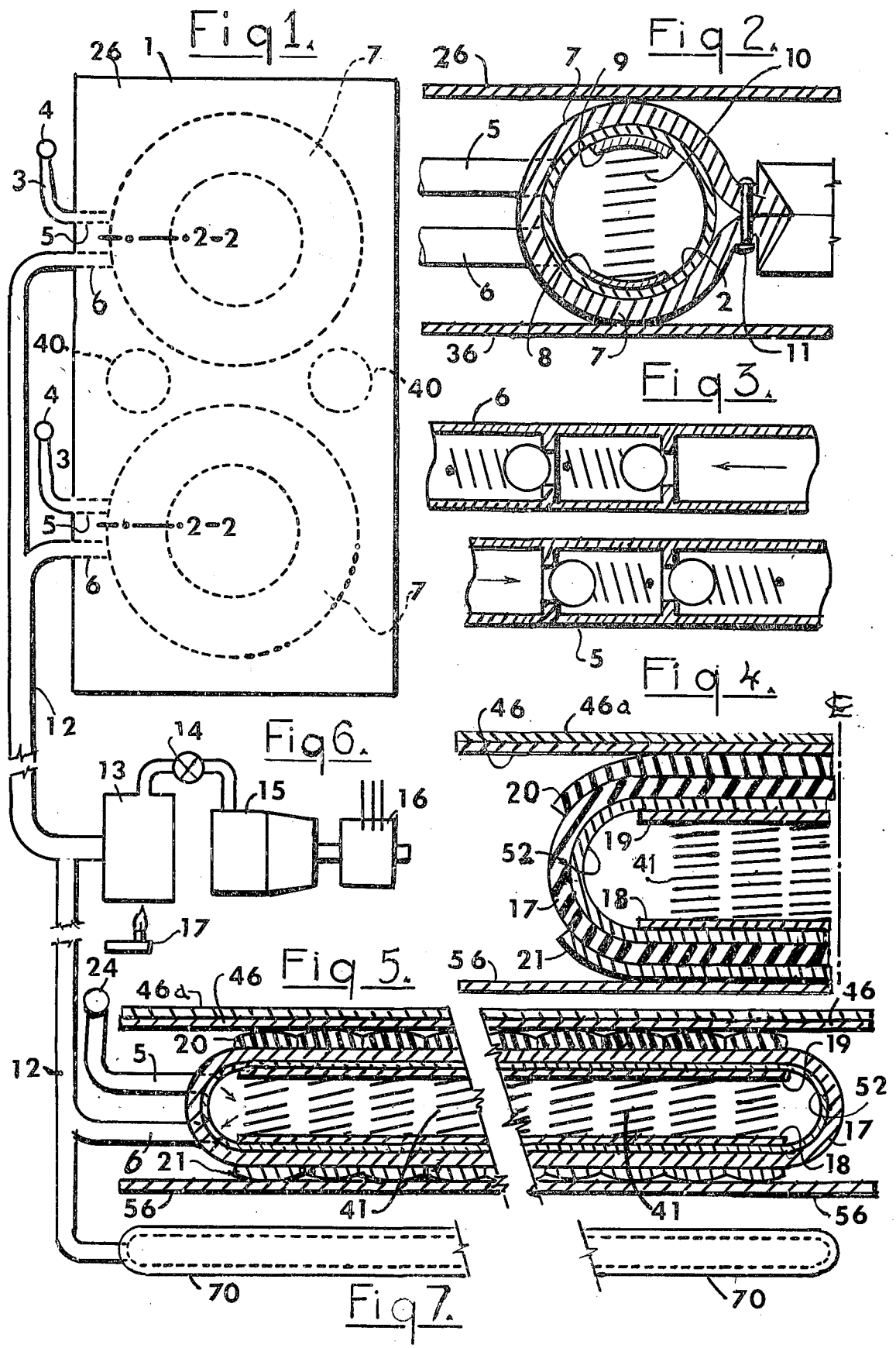

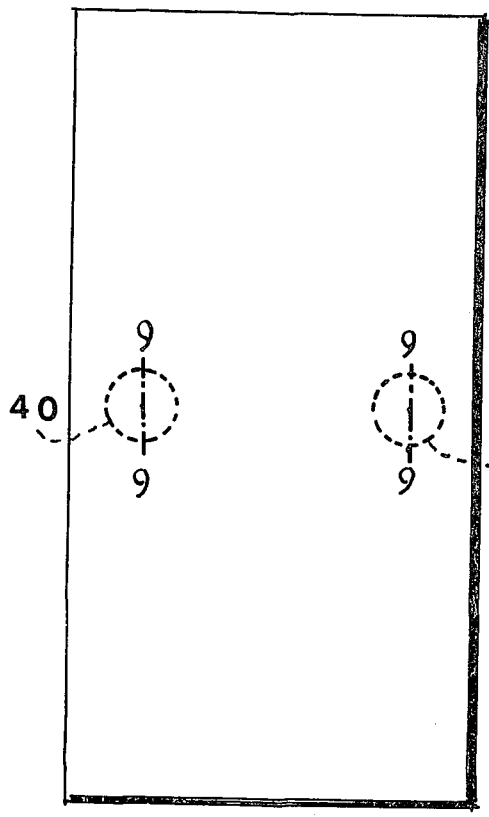
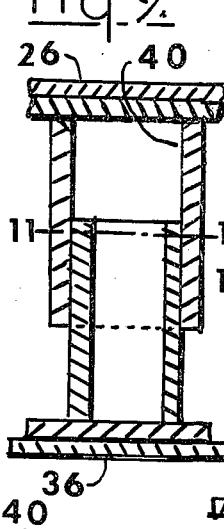
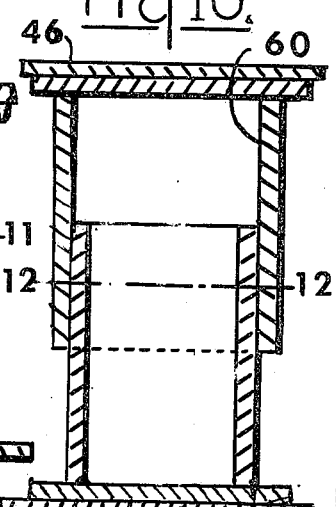
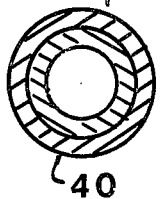
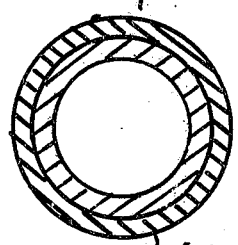
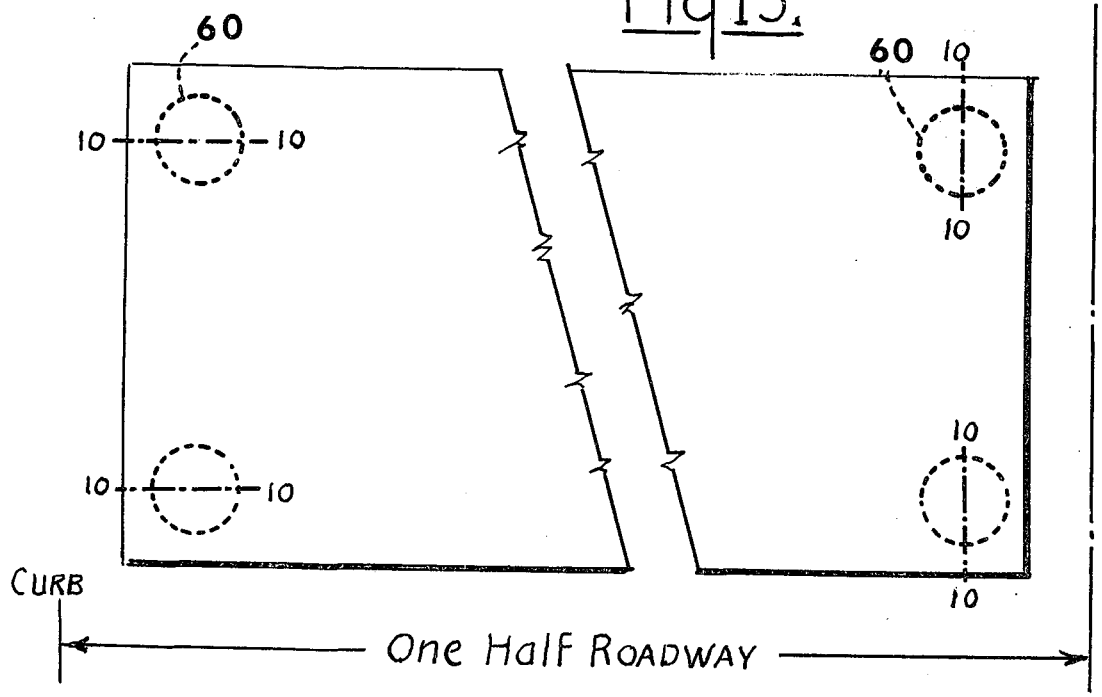

MEANS AND METHODS OF COMPRESSING ATMOSPHERIC AIR AND PRODUCING POWER AND VEHICULAR PROPELLANTS THEREFROM

Since some of the fossil fuels are now coming into short supply and have many other valuable uses rather than being burned merely for power production or vehicular propulsion, the application for these same purposes of the weight and forward movement of heavy self propelled conveyances prompts the numerous inventive concepts as disclosed herein.

The mere noise and road rumble of automobiles, autotrucks, large buses and tractor trailers, as they pass numerous check points where their sounds may be registered, give abundunt evidence of an enormous quantity of normally unused power that when properly harnessed can be made constantly into compressed atmospheric air that can then be used widely and economically in power plants both fixed and movable.

The development of fibrous cord and textile reinforcement of natural and synthetic rubber has given us valuable structural materials of exceptional strength, long life and toughness. Objects such as auto, auto-bus and tractor-trailer tires, that have travelled many thousands of miles, are automatically discarded, long before their possible service as structures, has been practically exhausted. As a matter of fact there is great strength and usefulness in millions of old rubber tires daily discarded. One of the prime objects of my present invention is to employ these same discarded rubber tires in new forms of atmospheric air compressing equipment. Another purpose is to minimise the destruction of roads and road beds, which so often takes place with the changes of the seasons.

In the drawings:

FIG. 1 shows a complete road bed bellows installation using a pair of old rubber tires beneath a metal plate as air compressing equipment.

FIG. 2 is section 2 — 2 in FIG. 1.

FIG. 3 illustrates a pair of check valves as used in my various rubber air compressors.

FIG. 4 is a partial cross wise cross section of my road bellows as illustrated in lengthwise section in FIG. 5.

FIG. 5 is a longitudinal section of my second type of road bellows employing out peices of old rubber tires in its crosswise construction.

FIG. 6 is a conventional heated air compressed air power plant.

FIG. 7 shows a rubber (reinforced rubber) balloonet for the temporary storage of road bellows compressed air.

FIG. 8 is another plan view of my road bellows air compressor as shown in plan in FIG. 1. FIG. 8 details the position of telescopic means employed to prevent my rubber air compressors from disassembling.

FIG. 9 is a detail of the telescopic devise referred to in FIG. 8.

FIG. 10 is the telescopic devise in section referred to in FIG. 13.

FIG. 11 is a cut section of the devise in FIG. 9.

FIG. 12 is a cut section of the devise in FIG. 10.

FIG. 13 shows how my road bellows is positioned across the road.

In my patent application Ser. No. 127,314 filed Mar. 23, 1971 in FIGS. 8, 9, and 10 I laid the groundwork for what is more elaborately illustrated and described herein.

Over certain roadways vehicles are passing ceaselessly. Their weight and forward motion represent tremendous power that can be collected and made of use. Since this is the prime purpose herein, and since I have never heard of any similar accomplishment, with an energy crisis upon us, my present plans are significant and timely to say the least.

In FIGS. 1 and 2 I take somewhat wornout rubber tires 7 and supply them with a heavy walled inner tube shown here by numeral 2. Supplied with air entrance 5 and air exit 6 before sealing this inner tube closed I insert a circle of upright steel springs held by large metal washers numbered 8 and 9. Inside a single tire, arranged in a circular fashion there can be as many as ten or twelve upright springs 10 within the inner tube 2 and the wornout tire wall 7. Over the tires 7 and 7 is a metal plate here designated as numeral 26, while the tires rest on another metal plate shown herein as number 36.

As a heavy moving vehicle moves across the plate 26 the springs and the tires tend to flatten pushing the air in the inner tube 2 out through check valve number 6.

After the vehicle has passed and the circle of springs 10 within inner tube 2 push the walls of the tires back into the their normal circular (cross section circular) position, as this takes place the check valve 5 is actuated, admitting a charge of new atmospheric air into inner tube 2. This air arrives at check valve 5 through pipe 3 and orifice 4.

While all this is taking place the compressed air storage balloonet 70 as shown in FIG. 7 is filling up with compressed air, some of which finds itself in compressed air heater 13 being supplied with heat through fuel burner 17.

In order for all this to function satisfactorily the worn rubber tire is clamped closed all around its internal periphery by 10 or 12 equally spaced rivets shown here as numeral 11. These rivets keep the assemblage properly closed when the tire is being flattened sidewise by the vehicle as it moves over and across metal plate 26. The metal plate will be positioned at least 2 or three inches above the ordinary road level, the edges of metal plate 26 is turned downward slightly (not shown) to enable the moving vehicle to ride up easily and run along the top of plate 26.

Between the two metal plates 26 and 36 which enclose the two tires 7 and 7 with their internal springs 10 I position two telescopic mechanism 40 and 40 shown in vertical section in FIG. 9 and in cross section in FIG. 11. The upper portion of the telescopic mechanism shown in FIG. 9 is welded to plate 26 while the lower portion of this same telescopic mechanism is electrically welded to the upper side of plate 36. As a moving vehicle passes over plate 26 upper cylinder member is pushed downwardly into lower cylinder member. With one or more of these telescopic mechanisms on each side of metal plates 26 and 36 there is every reason to believe that these two plates 26 and 36 will remain properly aligned one with the other, at all times.

There are two sheets in the drawings, namely Sheet 1 and Sheet 2. Sheet one carries the first seven figures while sheet two carries the figures from FIG. 8 to FIG. 13.

On both sheets FIGS. 1 and 8 show the road bellows or roadway rubber bellows type air compressor lieing in a longitudinal, or lengthwise the roadway, position. It is well within my present invention concept to make this roadway bellows, say twice as wide and twice as long containing several more rubber tire air compressors and covering much more of the roadway's surface. The compressed air after reaching the heated air expander 13 may then go forward through throttle valve 14 into air turbine 15 rotationaly coupled to electric generator 16. The centerline of the roadway is shown to the right of FIG. 10 FIG. 12 and FIG. 13 in Sheet 2 of the drawings.

On Sheet one in FIG. 4 I show one half of the sectional view of my second type of rubber air compressor shown in lengthwise section in FIG. 5 of the drawings.

A plan overall view of this second type of rubber air compressor is illustrated as FIG. 13 in sheet two of the drawings. Such a rubber belows air compressor, would, in it best installation stretch across the roadway preferably from near the curb to near the road's centerline (the centerline here marked by a "C" over an "L").

This "across the road" air compressor lies on a metal sheet 56 positioned below the top level of the road. Rubber peices 21 and 21 etc support a thick sheet rubber bladder 17 that encloses another rubber bladder shown on the drawings as numeral 52. Air inlet 5 with its check valve brings atmospheric air into the inner bladder 52. Air outlet 6 with its check valve removes air compressed from the inner bladder 52.

A bed of springs shown in FIG. 4 and FIG. 5 at number 41 is fastened at the top of the springs to metal plate 19 and at the bottom of the springs to metal plate 18 all resting inside rubber bladder 52 which, itself is inside the tougher bladder (made of fibrous reinforced layers of rubber) shown here at 17.

The springs keep the air compressing space open (to itself) when there is no vehicle resting on or passing over the top metal plate shown as numeral 46. To keep this top metal plate 46 from rusting it is provided with a glued-on cover 46a.

Fibrous reinforced rubber peices 20 and 21 are cuts from old wornout rubber tires to take the impact of the blows upon metal sheet 46 as the vehicles travelling in the road cross over and depress the roadway bellows 51. As metal plate goes down the springs 41 are accordingly squeezed forcing compressed irair out through 6 into compressed air pipe-line 12.

With the passage of the moving vehicle away from the top 46a of metal plate 46, the springs 41 expand upwardly sucking in air through port 50 and check valve 5 into the inner rubber bladder 52.

As the compressed air rushes out of check valve air outlet 6 it may go either to compressed air storage bladder 70 or thru pipe 12 into compressed air heater 13 heated by flame 17. Or, as an alternative it may go into an air liquifier, to be expanded either by an expansion valve (not shown) or by an expansion engine (not shown) then to be led back over the air about to be expanded (and in heat exchanging relation therewith) to emerge as liquid air to be used in propelling vehicles (land, water or aerial vehicles).

With continued use and with the upper metal plates 26 and 46 two or three inches above the normal top level of the roadway the outer edges meeting on comming vehicles will tend to bend slightly downwards as their use in the roadway (for compressing air) continues. As a matter of fact the top edges of the metal (the top metal) plate may have its top metal edges bend down slightly before it is positioned in the roadway to compress air. This is all within the province of my invention concept, even though in the present drawings it is not shown herewith.

It is evident that without the telescopic units (see FIG. 9 and FIG. 11) welded into position on the upper and lower sheets 26 and 36 in FIG. 2 and FIG. 1 and FIG. 8 and the telescopic units (see FIG. 10 and FIG. 12) welded into place on sheets 46 and 56 FIGS. 4, 5 and 13 there would soon be a misalignment between the various parts of my air compressing mechanisms.

Another matter to seriously consider the question of water accumulation wherever air is being compressed or where compressed air is being stored. Fortunately before assembly it is possible to galvanize, Parkerize or copper or nickel plate all of the metallic parts on the inside of my rubber bellows units.

All air inlets like numerals 4 and 24 admit the atmospheric air through an air inlet pipe that is turned downward so the rain will not enter the bellows. Suitable drain valves may be provided for water removal, even though these are not shown in the drawings (nor is the air inlet goose neck). Valves may also be provided for admitting into the bellows suitchemicals that will prevent any internal moisture from freezing inside of the expanding and contracting inner air chamber where the springs are located. In any case my invention is useful in many places where freezing (water freezing) temperatures are practically unknown.

The day may come when a compressed air system of pipes may be as customary as our nationwide fuel gas piping system across the country is today. Such a compressed air network can be picking up compressed air from windmills, water wheels, wave motors and other intermittent power sources, thus storing and transmitting compressed air stored up energy for use in many places where compressed air power is needed all the time.

Years ago much thought was given to compressed air power and what could be done with it. This was before the opening of the many vast sources of petroleum and natural gas that came into being. But carbon fuels, or so-called fossil fuels are commensing to indicate their ultimate exhaustion. It is for these reasons that more and more public attention is being directed to various sources of so-called fueless power and ways and means of making intermittent source power into continuous useful energy.

I claim:

1. An apparatus positioned in a roadway to allow a vehicle moving over it to compress air by reason of the weight of said vehicle, said apparatus comprising: an expansible chamber or bellows composed of a rubber tire of fiberous reinforced rubber having an inner tube internally expanded by coiled springs, an inlet check valve for admitting air into said bellows and an outlet check valve for exhausting air from said bellows.

* * * * *